United States Patent [19]

Bevers et al.

[11] Patent Number: 5,478,591
[45] Date of Patent: Dec. 26, 1995

[54] ALCOHOLIC BEVERAGE COMPOSITION

[75] Inventors: Johannes A. M. Bevers, Uden; Johannes A. Bindels, Schijndel; Martinus M. G. M. van den Hoven, Veghel, all of Netherlands

[73] Assignee: Campina Melkunie B.V., 's-Hertogenbosch, Netherlands

[21] Appl. No.: 439,709

[22] Filed: May 12, 1995

Related U.S. Application Data

[63] Continuation of Ser. No. 91,164, Jul. 13, 1993, abandoned.

[30] Foreign Application Priority Data

Jul. 14, 1992 [NL] Netherlands ............................ 9201267

[51] Int. Cl.$^6$ ..................................................... C12G 3/06
[52] U.S. Cl. .......................... 426/592; 426/11; 426/573; 426/575; 426/584; 426/593; 426/599; 426/654
[58] Field of Search ............................. 426/11, 592, 593, 426/599, 654, 573, 575, 584

[56] References Cited

U.S. PATENT DOCUMENTS

| | | | |
|---|---|---|---|
| 2,859,115 | 11/1958 | Rivoche | 426/593 |
| 3,978,243 | 8/1976 | Pedersen | 426/583 |
| 4,414,231 | 11/1983 | Ficca . | |
| 4,433,000 | 2/1984 | DeLeon et al. | 426/599 |
| 4,676,988 | 6/1987 | Efstathiou et al. | 426/592 |
| 4,902,517 | 2/1990 | Nakagawa et al. | 426/592 |

FOREIGN PATENT DOCUMENTS

| | | |
|---|---|---|
| 463696 | 1/1992 | European Pat. Off. . |
| 2084185 | 4/1982 | United Kingdom . |

OTHER PUBLICATIONS

Winter, R. 1989. Consumer's Dictionary of Food Additives, 3rd Ed. Crown Publishers, Inc. N.Y. p. 37.

*Primary Examiner*—Helen Pratt
*Attorney, Agent, or Firm*—Michael N. Meller

[57] ABSTRACT

An alcoholic beverage based on dairy constituents, such as milk protein and optionally milk fat-containing products, one or more fruit juices, such as fruit juices chosen from juice from berries, cherries, citrus, mint, strawberry, raspberry, plums, peaches, tropical fruits and combinations thereof, cocoa constituents, one or more stabilizers and optionally one or more thickeners is described.

23 Claims, No Drawings

ALCOHOLIC BEVERAGE COMPOSITION

This application is a continuation of application Ser. No. 08/091,164, filed Jul. 13, 1993, now abandoned.

This invention relates to stable sour alcoholic beverages which, in addition to dairy constituents and fruit juices, contain chocolate and/or cocoa constituents.

It is not known to combine these ingredients, i.e., dairy, alcohol, fruit juices, and cocoa and/or chocolate into a preferably sour, but, in particular, stable beverage. There are products known which are based on dairy and alcohol, such as cream liqueur or yoghurt liqueur, sour dairy liqueur (based on dairy with alcohol and fruit juices), and cocoa liqueur, which is based on alcohol with cocoa constituents.

EP-A 0 067 592 describes a cream liqueur based on cream, sugar and ethanol. The use of emulsifiers with a HLB value (Hydrophilic-Lipophilic Balance)<12 in combination with a casein salt as stabilizer gives the desired product, if carefully prepared.

EP-A 177 077 describes a yoghurt liqueur. According to this publication, microbiologically acidified milk is mixed with fruit juices and alcohol, yielding a stable and tasty beverage.

EP-A 463 696 relates to a stable dairy liqueur, in which an alginate is used to stabilize a mixture of milk products with sour alcoholic fruit juices.

Cocoa liqueurs are also known. A characteristic of these is that a cocoa extract or cocoa constituents are mixed with an alcohol-containing solution. To complete the beverage, typically sugars, for instance honey, and additional coloring and flavoring substances are added. If cocoa extracts are used, no stability problems are to be expected because the starting material is a virtually clear and stable extract. Upon dilution with alcohol, the stability is maintained. Since cocoa powder and chocolate give a clearly fuller taste than cocoa extract, the former are typically preferred. However, the use of cocoa powder or chocolate, neither of which is completely soluble in water or alcohol, soon gives rise to stability problems. The stability problems are minimized by using thickeners, such as xanthan, and stabilizers, such as for instance carrageenan and lecithin.

Stability problems are also known in the case where cocoa is processed with milk and sugar to form drinking chocolate. In spite of many years of efforts, every bottle of drinking chocolate has a layer of cocoa constituents deposited on the bottom. Only one stabilizer, viz. carrageenan, is capable of solving this stability problem to some acceptable extent. Fortunately, the consumer has learned to accept this stability problem and faithfully shakes the bottle before use.

As appears from the above examples (cocoa liqueur, drinking chocolate), chocolate is an excellent starting material for the preparation of tasty products and beverages. A new dimension could be added to the taste of cocoa liqueurs if it were possible to combine them with dairy products and, preferably sour, fruit juices. The organoleptic sensation in the mouth obtained if the ingredients of chocolate, dairy, and fruit juice are combined with alcohol and sugar into a liquid creation, a beverage, can be described best by the term "liquid bonbon". With a traditional bonbon, not every combination of fruits, chocolate and alcohol is possible; the chocolate must provide the firmness/coating and is a limiting factor. With a "liquid bonbon", much more variation is possible, yielding an entirely new range of products and flavors.

Accordingly, in a first embodiment, the present invention relates to an alcoholic beverage based on dairy constituents, one or more fruit juices, cocoa constituents and one or more stabilizers. Such an alcoholic beverage has a particularly pleasant taste, based on the combination of the taste of cocoa and that of fruits. Preferably, a slightly sour beverage is aimed for, which property can be obtained by using sour fruit juices and/or nutritive acids. The pH aimed for lies between 3 and 5.

Surprisingly, it has been found that in these dairy beverages according to the invention, the flavor of fruit is pleasantly pronounced, while yet the cocoa flavor is well preserved.

Surprisingly, it has been found that in the beverage according to the invention, the fresh color of the fruit juices, in particular of sour red fruit juices, and of the cocoa comes out well, in particular in combination with alcohol. The presence of milk products might be expected to have a "whitening" effect, which might cause the original fresh color of the fruits to fade to greyish. It has been found, however, that the presence of dairy constituents gives a creamy character to the appearance of the beverage.

It has also been found that through relatively minor variations in the formulation, the taste of the beverage according to the invention can be directed, as required, to an enhancement of the taste of the cocoa, the taste of the fruit or of the dairy character. Surprisingly, in the beverage according to the invention the stability of the taste is maintained as well. In the time between production and consumption, which may be about one year at a maximum, no loss or hardly any loss of flavor developed.

In another aspect, the present invention is directed to obtaining a cocoa and fruit juice-containing dairy liqueur which is sufficiently stabilized. Surprisingly, it has been found that the cocoa, coming from cocoa powder, can be stabilized sufficiently by using an alginate stabilizer, pectin, carboxymethyl cellulose, or combinations thereof. More particularly, to that end a propylene glycol ester of alginic acid is used. Preferably, the stabilization according to the invention occurs in combination with thickeners, such as xanthan, for obtaining the desired viscosity and the organoleptic sensation associated therewith. Surprisingly, also in the case of products based on sour fruit juices, such as pineapple, lemon juice or berries, stable products were obtained. Sourer beverages, in particular, might be expected to lose stability, since it is known that milk or milk constituents are not stable at lower pH.

By adapting the amounts and nature of the thickeners, the viscosity can be adjusted. Preferably, a viscosity is aimed for, which is higher than the viscosity of cream liqueur, but not so high as to make it impossible to drink the product.

The essential constituents of the beverage according to the invention are dairy constituents, fruit juice, cocoa constituents and stabilizing/thickening agents.

As dairy constituents, products are used which contain milk protein and, optionally, milk fat. Examples include cream, milk, concentrated low-fat milk, milk powder, whey protein products, milk protein concentrates, casein protein-containing products and/or yoghurt. The amount of dairy constituents is 10–900 g per liter beverage. This amount is based on the amount of dairy constituents in the form in which they are used. Naturally, dairy constituents in a more concentrated form can be added in smaller amounts.

The fruit juices to be used can be based on the conventional fruit juices for use in beverages. The fruit juices can be used both in pure form and in the form of concentrates or alcoholic fruit extracts. Examples of suitable fruit juices include the juices from, for example, pineapple, berries, cherries, citrus, mint, strawberry, raspberry, plums, peaches, tropical fruits and combinations thereof.

The alcohol content of the beverage is preferably between 0.5 and 30 wt. %.

The stabilizer system is used in an amount of 0.1 to 2 wt. %, drawn to the beverage. The thickeners, such as xanthan, are used in amounts of 0.05 to 1.5 wt. %, drawn to the beverage.

The cocoa constituents to be used in the beverage according to the invention, preferably present in an amount of 5–150 g cocoa constituents per liter, can be added in the form of cocoa powder and/or cocoa mass, optionally in combination with cocoa butter. It is also possible to add the cocoa constituents in the form of chocolate or chocolate imitations. It is also possible to use chocolate extract, although this is not preferred.

Finally, the alcoholic beverage according to the invention may further contain aromatic and flavoring substances, which are preferably of natural origin, carbohydrates, dextrose syrup or maltodextrins, artificial sweeteners and coloring substances. Optionally, water is added as well.

The beverage according to the invention can be prepared in a conventional manner as known for other dairy beverages. The various components can be mixed with each other, optionally homogenized, and, depending on the alcohol content, be optionally pasteurized. In the case of higher alcohol percentages, pasteurization is less necessary. After preparation, the beverage is preferably bottled.

In the above, it was assumed that alcohol is used in the beverage according to the invention. It is observed, however, that it is also possible to make a non-alcoholic beverage.

The present invention will now be further explained in and by the following two, non-limiting Examples.

EXAMPLE 1

To prepare 1,000 liters of sour cocoa liqueur, the following procedure was followed. 59.8 liters of cream (42% milk fat) were mixed with 85.9 l milk, 12 kg cocoa butter and 2.5 l water. This mixture was homogenized in a two-stage homogenizer (Alfa Laval) at 150/20 bar. Added to this dairy mix were, in succession, 83.3 l 96% ethanol, 6 kg propylene glycol alginate and 250 kg sugar, whereupon, after vigorous stirring with a fast-running mixing device, a stabilized alcohol-cream base was obtained. Added to this base were 62 l concentrated orange juice (65° Brix) and 23 kg low-fat cocoa powder dissolved in 200 l water of 70° C. Finally, 320 l water were added.

This suspension was heated to 70° C and homogenized twice in a two-stage homogenizer at 150/20 bar. Between and after the homogenization steps, the product was cooled to 20° C. After the final homogenization step, the beverage was aseptically bottled in 0.7-liter bottles. After storage at room temperature for 12 months, no destabilization phenomena were observed.

EXAMPLE 2

A cream base was prepared by diluting 53 l concentrated low-fat milk (dry matter 36% and protein 12%) with 46 l mains water and 37 l fresh cream of a fat content of 42%. Analogously to Example 1, this mixture was homogenized in a two-stage homogenizer at 120/20 bar and subsequently pasteurized at 70° C. Added to this cream base were 336 kg sugar and 400 l alcoholic cherry extract (40% alcohol). The ingredients were dissolved with stirring and heating to 70° C. Subsequently, with vigorous stirring, 5 kg propylene glycol alginate and 2 kg carboxymethyl cellulose and 1 kg xanthan were suspended and dissolved herein. Finally, 60 kg chocolate were added. After heating to 60° C., the suspension was homogenized in a two-stage homogenizer at 120/20 bar. After cooling to 20° C, the product was re-heated to 60° C and homogenized in two stages at 150/20 bar. After being bottled in 0.75-liter bottles, the beverage proved not to exhibit any destabilization phenomena for a storage time of 12 months at room temperature.

A comparable charge of product where, instead of propylene glycol alginate, carrageenan was used, appeared to be unstable directly after preparation; it exhibited sedimentation and separation phenomena.

We claim:

1. An alcoholic beverage based on alcohol and dairy constituents, one or more fruit juices, cocoa constituents selected from the group consisting of cocoa powder, cocoa mass and a mixture of cocoa powder and cocoa mass, and one or more stabilizers.

2. An alcoholic beverage as in to claim 1, wherein the pH is between 3 and 5.

3. An alcoholic beverage as in claim 2, wherein sour fruit juices and/or nutritive acids have been added.

4. An alcoholic beverage as in claim 2, wherein 5–150 g cocoa constituents per liter are present.

5. An alcoholic beverage as in claim 2, wherein 5–300 g alcohol per liter are present.

6. An alcoholic beverage as in claim 2, wherein it contains 10–900 g dairy constituents per liter.

7. An alcoholic beverage as in claim 2, wherein the fruit juices are selected from the group consisting of juice from cherries, citrus, mint, strawberries, raspberries, other berries, plums, peaches, tropical fruits and combinations thereof.

8. An alcoholic beverage as in claim 2, wherein the stabilizer is an alginic acid ester.

9. An alcoholic beverage according to claim 8, wherein one or more additional stabilizers are added.

10. An alcoholic beverage as in claim 1, wherein 5–150 g of cocoa constituents per liter are present.

11. An alcoholic beverage as in claim 10, wherein 5–300 g alcohol per liter are present.

12. An alcoholic beverage as in claim 10, wherein it contains 10–900 g dairy constituents per liter.

13. An alcoholic beverage as in claim 1, wherein 5–300 g alcohol per liter are present.

14. An alcoholic beverage as in claim 13, wherein it contains 10–900 g dairy constituents per liter.

15. An alcoholic beverage as in claim 1, wherein it contains 10–900 g dairy constituents per liter.

16. An alcoholic beverage as in claim 1, wherein the fruit juices are selected from the group consisting of juice from cherries, citrus, mint, strawberries, raspberries, other berries, plums, peaches, tropical fruits and combinations thereof.

17. An alcoholic beverage as in claim 1, wherein the stabilizer is an alginic acid ester.

18. An alcoholic beverage according to claim 17, wherein one or more thickeners are added.

19. An alcoholic beverage according to claim 1, wherein one or more thickeners are added.

20. An alcoholic beverage as in claim 1 wherein sour fruit juices and/or nutritive acids have been added.

21. An alcoholic beverage as in claim 20 wherein 5–150 g cocoa constituents per liter are present.

22. An alcoholic beverage as in claim 20, wherein 5–300 g alcohol per liter are present.

23. An alcoholic beverage as in claim 20, wherein it contains 10–900 g dairy constituents per liter.

* * * * *